S. S. SWANSON.
SUPPORT FOR VEHICLES.
APPLICATION FILED MAR. 3, 1915.
1,176,789.
Patented Mar. 28, 1916.
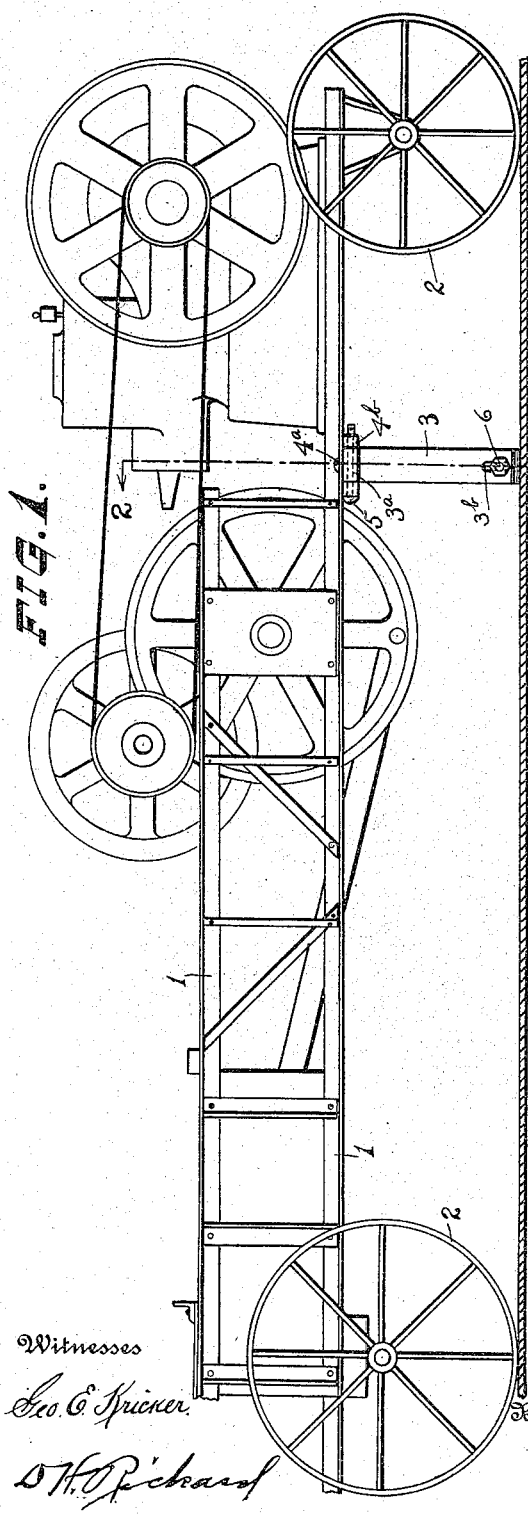

UNITED STATES PATENT OFFICE.

STARLEY S. SWANSON, OF BELLEVUE, OHIO, ASSIGNOR TO THE OHIO CULTIVATOR COMPANY, OF BELLEVUE, OHIO, A CORPORATION OF OHIO.

SUPPORT FOR VEHICLES.

1,176,789.   Specification of Letters Patent.   Patented Mar. 28, 1916.

Application filed March 3, 1915. Serial No. 11,681.

*To all whom it may concern:*

Be it known that I, STARLEY S. SWANSON, a citizen of the United States, residing at Bellevue, in the county of Huron and State of Ohio, have invented certain new and useful Improvements in Supports for Vehicles, of which the following is a specification.

My invention relates to improvements in supports for vehicles, and more particularly to adjustable supports or braces for wheeled vehicle frames carrying power or motor operated machinery such as hay presses, grain threshing and separating machinery, grinding mills, and the like, mounted upon wheeled frames or trucks so as to be adapted to be transported from place to place for use. The wheeled frame used in connection with such machinery is frequently of considerable length between the wheels or trucks so that on account of the weight and motion of the superposed machinery between such wheels or trucks there is a tendency while the machine is in motion for the vehicle frame to sag or vibrate vertically between such wheels or trucks, and the primary object of the present invention is to provide a generally improved adjustable and foldable support or brace for supporting and bracing this portion of the vehicle frame to prevent such vibration.

A further object of the invention is to provide a support or brace for vehicle frames of this class of exceedingly simple, cheap, and efficient construction, and which may not only be readily adjusted to meet the varying exigencies of actual service, but which may be readily folded up when not in use or for transportation.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings forming a part of this specification, Figure 1, is a side elevation of the improved support or brace in its operative or bracing position applied to the wheeled frame of a vehicle in the form of a hay press. Fig. 2, a cross sectional view taken on line 2—2 of Fig. 1, the dotted line showing the position of the parts when folded up for transportation of the vehicle.

Fig. 3, a modified form of a tie rod or tension member for detachably and adjustably connecting the free ends of the brace members of the improved support or brace.

Similar numerals of reference designate like parts throughout all the figures of the drawings.

The improved brace or support is adapted to be attached to the wheeled vehicle frame intermediate the wheels thereof for the purpose of bracing or stabilizing this portion of the frame.

The frame 1, may be of any suitable and convenient construction, and in the present instance, consists of longitudinally extending beams 1, suitably braced and connected and mounted upon the wheels 2.

The improved support or brace, comprises a pair of pivotally connected transversely foldable brace or leg members 3, said brace or leg members being pivotally mounted and connected to the frame in any suitable and convenient manner and preferably normally extending downwardly from the frame and diverging from each other in their normal bracing position as shown in Fig. 2 of the drawings.

The brace members 3, are preferably connected to the frame beams 1, at the lower side of the frame, in the present instance, by means of a transversely extending hinge or supporting bar 4, the latter being suitably connected to the lower beams 1, as for example, by means of rivets 4$^a$. The supporting or attaching bar 4, in the present instance, is provided at its ends with curved hinge lugs 4$^b$, suitably spaced apart to receive the curved pivot portion 3$^a$, of the brace members 3, said hinge portions 3$^a$, being secured between the hinge lugs 4$^b$, by means of pivot bolts 5.

As a means of detachably and adjustably connecting the free ends of the brace members 3, together, a tie rod or tension member 6, is provided, said attaching and adjusting member 6, in the present instance, being connected to the free ends of the brace members 3, by passing through suitable slots or openings 3$^b$, and as a means of removably mounting the rod or tension member 6, in the slots or openings 3$^b$, as well as adjustably connecting the free ends of the brace members 3, together, so that the latter may be drawn toward or permitted to expand with respect to each other in adjusting to an uneven surface or ground to meet the varying demands of actual service securely bracing the parts, one or both ends of the tie or tension member 6, may be provided with an adjusting nut 7, as shown in Figs. 2 and 3, respectively.

When the brace members are in their down or bracing position as shown in Figs. 1 and 2 of the drawings, it is obvious that by drawing the nut 7, up, the free ends of the legs or brace members 3, will be drawn toward each other, thereby securely bracing the intermediate part of the vehicle frame as against sagging or vertical vibrations.

When it is desired to fold up the brace members 3, when not in use, or for transportation, one of the nuts 7, may be removed and the legs or brace members may be folded up at the sides of the frame as shown by dotted lines in Fig. 2, and the rod or tension member 6, passes through the opposite brace member and is secured to hold the brace members in their upwardly folded positions as indicated in Fig. 2 of the drawings. In the modified form of the tie or adjusting member 6, shown in Fig. 3 of the drawings, I have shown such member threaded at its inner ends and provided with a turn buckle 8, connecting the two parts, one part being provided with a cross pin 8$^a$, to be inserted in holes 8$^b$, to readily adjust same to the varying positions of the brace members 3, as well as to serve to centralize the rod or member 6, with-in the slots or openings 3$^b$.

From the foregoing description, taken in connection with the accompanying drawings, the operation and advantages of my invention will be readily understood.

Having thus described one of the embodiments of my invention, what I claim and desire to secure by Letters Patent, is:—

1. A support for vehicles, comprising a wheeled vehicle frame, brace members transversely foldable on and hingedly connected to said frame intermediate the wheeled portions thereof, and a tension member removably and adjustably connected to the free ends of said brace members for holding the latter in their respective bracing and folded positions.

2. In a support for vehicle frames, the combination with a frame provided at its ends with ground wheels; of transversely swinging brace members connected to the lower outer corners of said frame intermediate said ground wheels and adapted to extend outwardly at an irregular diverging angle to each other beyond the planes of said ground wheels, and an adjustable tension member loosely and detachably mounted in said brace members whereby the latter are held in their adjusted bracing positions.

3. A support for vehicle frames, comprising a wheeled frame, brace members pivotally connected to and transversely foldable thereon between the wheels thereof, and adjusting means loosely and detachably connecting the free ends of said brace members in their respective bracing and folded positions, said adjusting means being adapted to be adjusted to hold said brace members at a varying bracing angular position with respect to each other whereby to conform the same to the irregularities of the subjacent surface on which the vehicle is supported.

4. A support for vehicles, comprising a wheeled frame, brace members pivotally connected to and transversely foldable thereon between the wheeled portions of said frame in downwardly bracing and upwardly foldable positions, and adjustable means loosely and detachably connected to the free ends of said brace members in their respective bracing and folding positions whereby the latter are held at a varying angle with respect to each other.

5. In a support for vehicle frames, the combination with the wheeled frame to be supported, and transversely foldable brace members on each side adapted in their bracing position to extend downwardly and outwardly at a varying diverging angle from each other to conform to the irregularities of the surface upon which the vehicle is supported and in their folded position to extend upwardly in a reverse position at the sides of said frame; of an adjustable tension rod removably and adjustably connected to said brace members whereby the latter are prevented from spreading in their respective bracing and reversed positions and whereby the same are connected at a varying angle relative to each other.

In testimony whereof I have affixed my signature in presence of two witnesses.

STARLEY S. SWANSON.

Witnesses:
 W M H. ZIMMERMAN,
 DANIEL SELTZER.